(12) United States Patent
Egnor et al.

(10) Patent No.: US 8,650,197 B2
(45) Date of Patent: Feb. 11, 2014

(54) AUTHORITATIVE DOCUMENT IDENTIFICATION

(75) Inventors: Daniel Egnor, New York, NY (US); Geeta Chaudry, West Lebanon, NH (US)

(73) Assignee: Google Inc., Mountain View, CA (US)

( * ) Notice: Subject to any disclaimer, the term of this patent is extended or adjusted under 35 U.S.C. 154(b) by 0 days.

(21) Appl. No.: 13/417,026

(22) Filed: Mar. 9, 2012

(65) Prior Publication Data

US 2012/0173544 A1 Jul. 5, 2012

Related U.S. Application Data

(63) Continuation of application No. 11/024,967, filed on Dec. 30, 2004, now abandoned.

(51) Int. Cl.
*G06F 17/30* (2006.01)

(52) U.S. Cl.
USPC .................. 707/748; 707/736; 707/E17.008; 707/E17.018

(58) Field of Classification Search
USPC ......................................................... 707/741
See application file for complete search history.

(56) References Cited

U.S. PATENT DOCUMENTS

| | | | | |
|---|---|---|---|---|
| 5,875,446 | A * | 2/1999 | Brown et al. | 1/1 |
| 6,643,640 | B1 * | 11/2003 | Getchius et al. | 707/719 |
| 7,231,405 | B2 | 6/2007 | Xia | |
| 2001/0011270 | A1 | 8/2001 | Himmelstein et al. | |
| 2002/0016786 | A1 * | 2/2002 | Pitkow et al. | 707/3 |
| 2002/0078035 | A1 | 6/2002 | Frank et al. | |
| 2002/0129014 | A1 | 9/2002 | Kim et al. | |
| 2002/0133374 | A1 * | 9/2002 | Agoni et al. | 705/2 |
| 2003/0065805 | A1 * | 4/2003 | Barnes, Jr. | 709/231 |
| 2004/0030741 | A1 * | 2/2004 | Wolton et al. | 709/202 |
| 2004/0064334 | A1 * | 4/2004 | Nye | 705/1 |
| 2004/0236730 | A1 | 11/2004 | Frank | |
| 2005/0004830 | A1 | 1/2005 | Rozell et al. | |
| 2005/0043060 | A1 | 2/2005 | Brandenberg | |
| 2005/0203924 | A1 | 9/2005 | Rosenberg | |
| 2005/0216362 | A1 * | 9/2005 | Navar et al. | 705/26 |
| 2005/0256887 | A1 * | 11/2005 | Eiron et al. | 707/100 |
| 2005/0262050 | A1 * | 11/2005 | Fagin et al. | 707/3 |
| 2006/0136098 | A1 * | 6/2006 | Chitrapura et al. | 700/262 |

FOREIGN PATENT DOCUMENTS

| | | |
|---|---|---|
| JP | 2000-250931 A | 9/2000 |
| JP | 2000-348041 A | 12/2000 |
| JP | 2003-067419 A | 3/2003 |
| JP | 2003-173280 A | 6/2003 |
| JP | 2003-524259 A | 8/2003 |
| JP | 2004-227165 A | 8/2004 |
| WO | WO 01/63479 A1 | 8/2001 |
| WO | WO 01/65410 A3 | 9/2001 |

OTHER PUBLICATIONS

Thijs Westerveld et al.; Retrieving Web Pages using Content, Links, URLs and Anchors; Text Retrieval Conference Proceedings; Nov. 13, 2001; pp. 663-672.

(Continued)

*Primary Examiner* — Shyue Jiunn Hwa
(74) *Attorney, Agent, or Firm* — Harrity & Harrity, LLP

(57) ABSTRACT

A system determines documents that are associated with a location, identifies a group of signals associated with each of the documents, and determines authoritativeness of the documents for the location based on the signals.

20 Claims, 6 Drawing Sheets

(56) References Cited

OTHER PUBLICATIONS

Thijs Westerveld et al., Retrieving Web Pages using Content, Links, URLs and Anchors: Text Retrieval Conference Proceedings; Nov. 13, 2001; pp. 663-672.

International Search Report for corresponding PCT application with a mailing date of; Apr. 21, 2006; 4 pages.

* cited by examiner

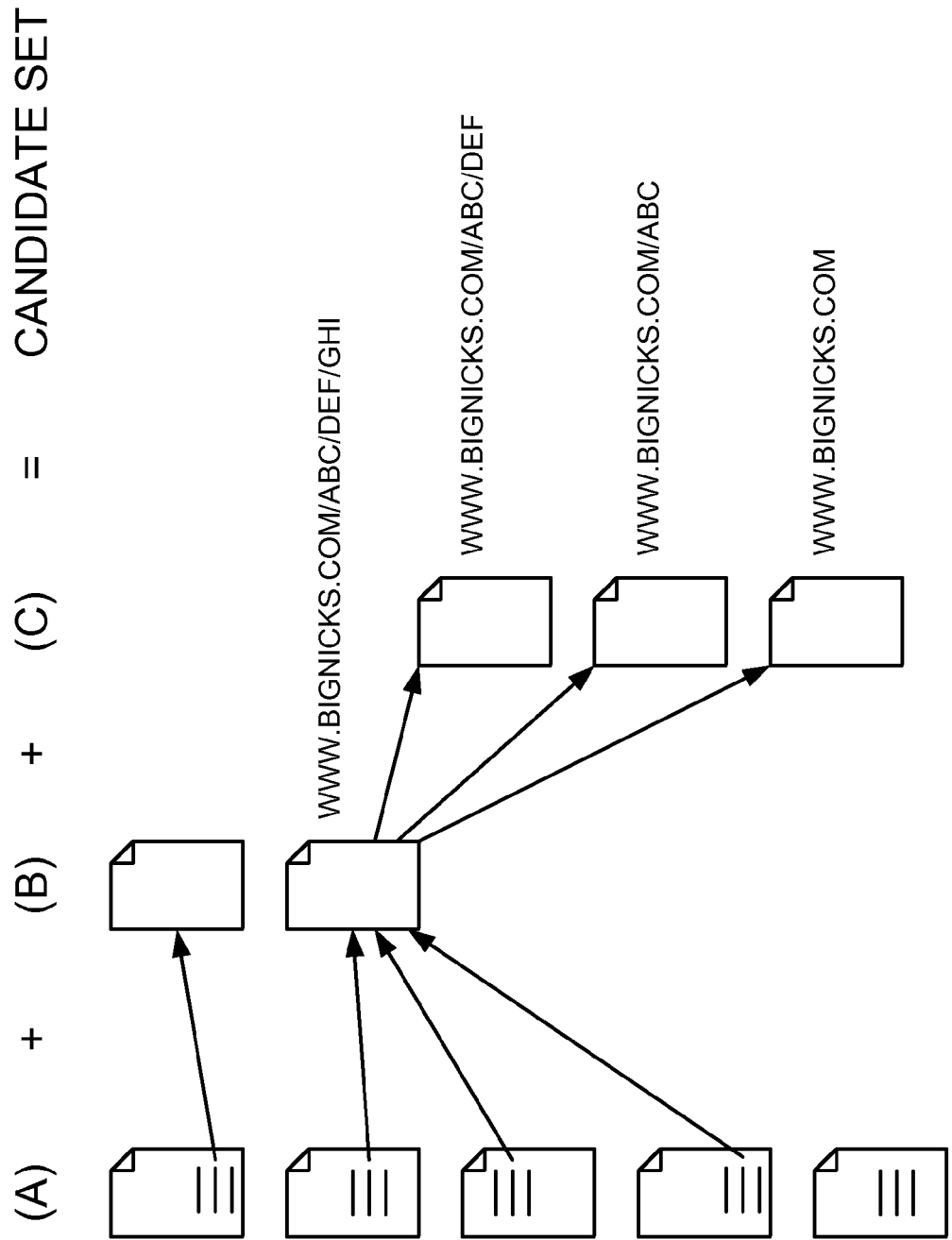

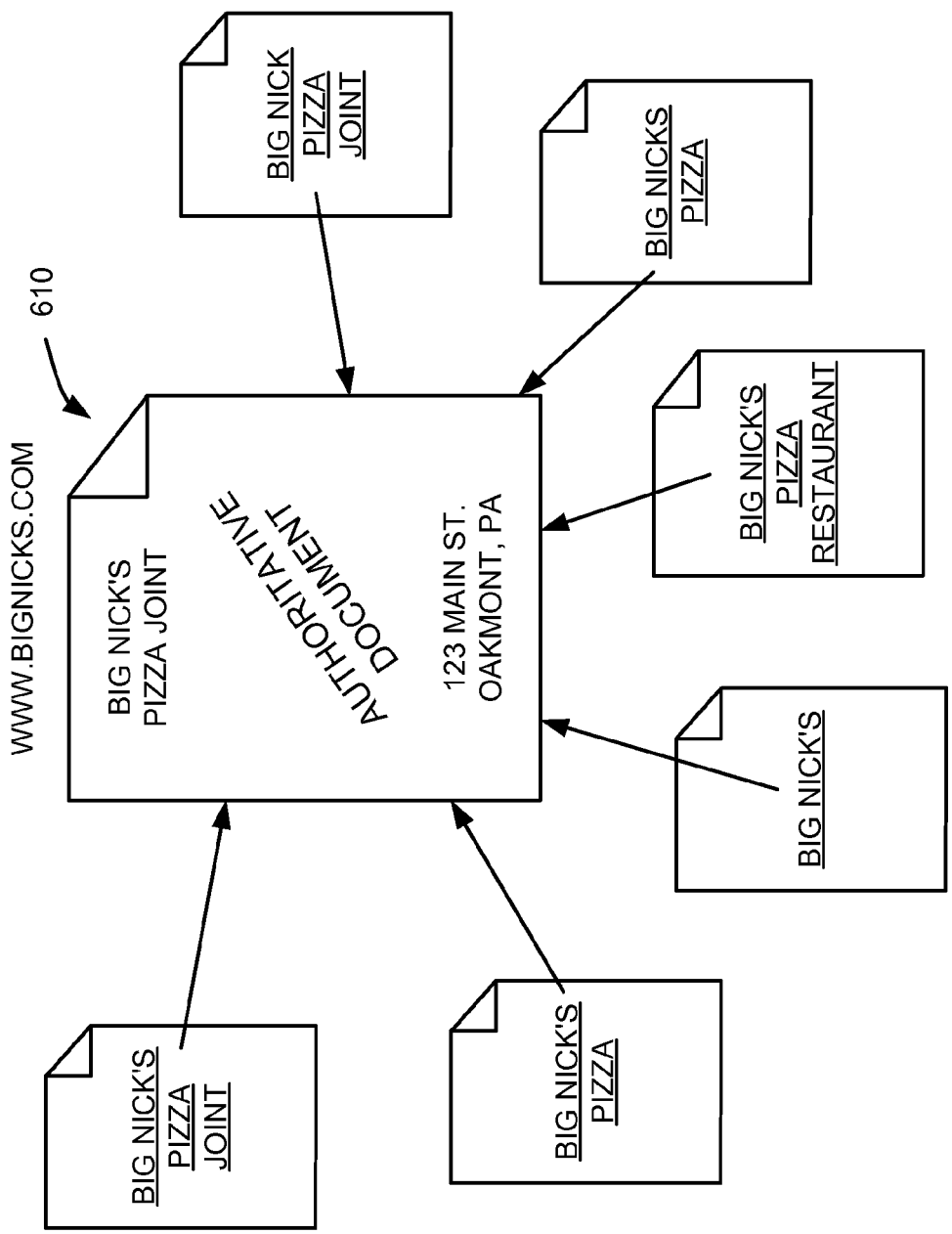

AUTHORITATIVE DOCUMENT IDENTIFICATION

RELATED APPLICATION

This application is a continuation of U.S. patent application Ser. No. 11/024,967, filed Dec. 30, 2004, which is incorporated herein by reference.

BACKGROUND

1. Field of the Invention

Implementations described herein relate generally to information retrieval and, more particularly, to the identification of authoritativeness of documents for a location.

2. Description of Related Art

Modern computer networks, and in particular, the Internet, have made large bodies of information widely and easily available. Internet search engines, for instance, index many millions of web documents that are linked to the Internet. A user connected to the Internet can enter a simple search query to quickly locate web documents relevant to the search query.

Frequently, users are interested in finding documents relating to a particular location. A document that is authoritative for the location, however, may not include the address of the location. Sometimes the address is located in a sub-document or in an image that cannot be analyzed (e.g., indexed). This makes it difficult to identify an authoritative document.

SUMMARY

According to one aspect, a computer-readable medium may store computer-executable instructions, including instructions for identifying documents that are associated with a location, instructions for determining a set of signals associated with the documents, and instructions for determining authoritativeness of the documents for the location based on the signals.

BRIEF DESCRIPTION OF THE DRAWINGS

The accompanying drawings, which are incorporated in and constitute a part of this specification, illustrate an embodiment of the invention and, together with the description, explain the invention. In the drawings.

FIG. 5 is an exemplary diagram that illustrates how documents may be chosen as candidate documents according to an implementation consistent with the principles of the invention; and FIG. 6 is an exemplary diagram of signals that may be considered when identifying the authoritativeness of a document according to an implementation consistent with the principles of the invention.

DETAILED DESCRIPTION

The following detailed description of the invention refers to the accompanying drawings. The same reference numbers in different drawings may identify the same or similar elements. Also, the following detailed description does not limit the invention.

Overview

Figure 1:
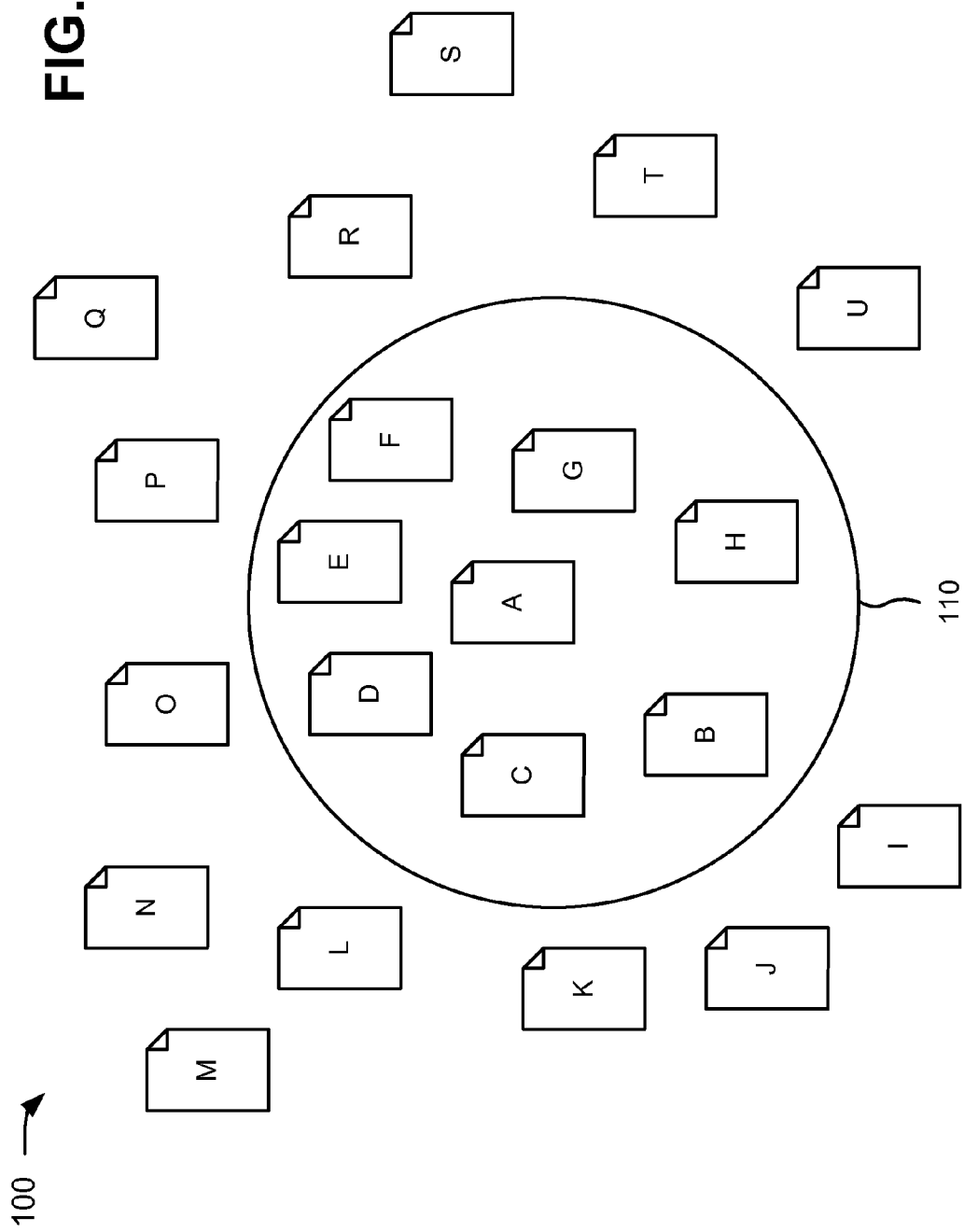
FIG. 1 is an exemplary diagram illustrating a concept consistent with the principles of the invention.

FIG. 1 is an exemplary diagram illustrating a concept consistent with the principles of the invention. Consider a corpus 100 of local documents. The documents are local in the sense that they are associated with a particular geographic area—though not necessarily the same geographic area. A document that relates to a business listing, for example, can be considered a local document because it is associated with the particular address of the business.

Documents in corpus 100 may be analyzed to determine the locations with which they are associated. For example, assume that the documents in set 110 relate to the same location. Each of the documents in set 110 may refer in some way to the location. For example, a document in set 110 may mention a business at the location, the address of the business, and/or a telephone number associated with the business. One of the documents in the set may be more authoritative for the location than another one of the documents. For example, a document corresponding to the home page of a restaurant at the location may be considered more authoritative for the location than a document corresponding to a review of the restaurant. Systems and methods consistent with the principles of the invention may determine the authoritativeness of documents associated with a location.

A "document," as the term is used herein, is to be broadly interpreted to include any machine-readable and machine-storable work product. A document may include, for example, an e-mail, a web site, a business listing, a file, a combination of files, one or more files with embedded links to other files, a news group posting, a blog, a web advertisement, etc. In the context of the Internet, a common document is a web page. Web pages often include textual information and may include embedded information (such as meta information, images, hyperlinks, etc.) and/or embedded instructions (such as Javascript, etc.). A "link," as the term is used herein, is to be broadly interpreted to include any reference to/from a document from/to another document or another part of the same document.

Exemplary Network Configuration

Figure 2:
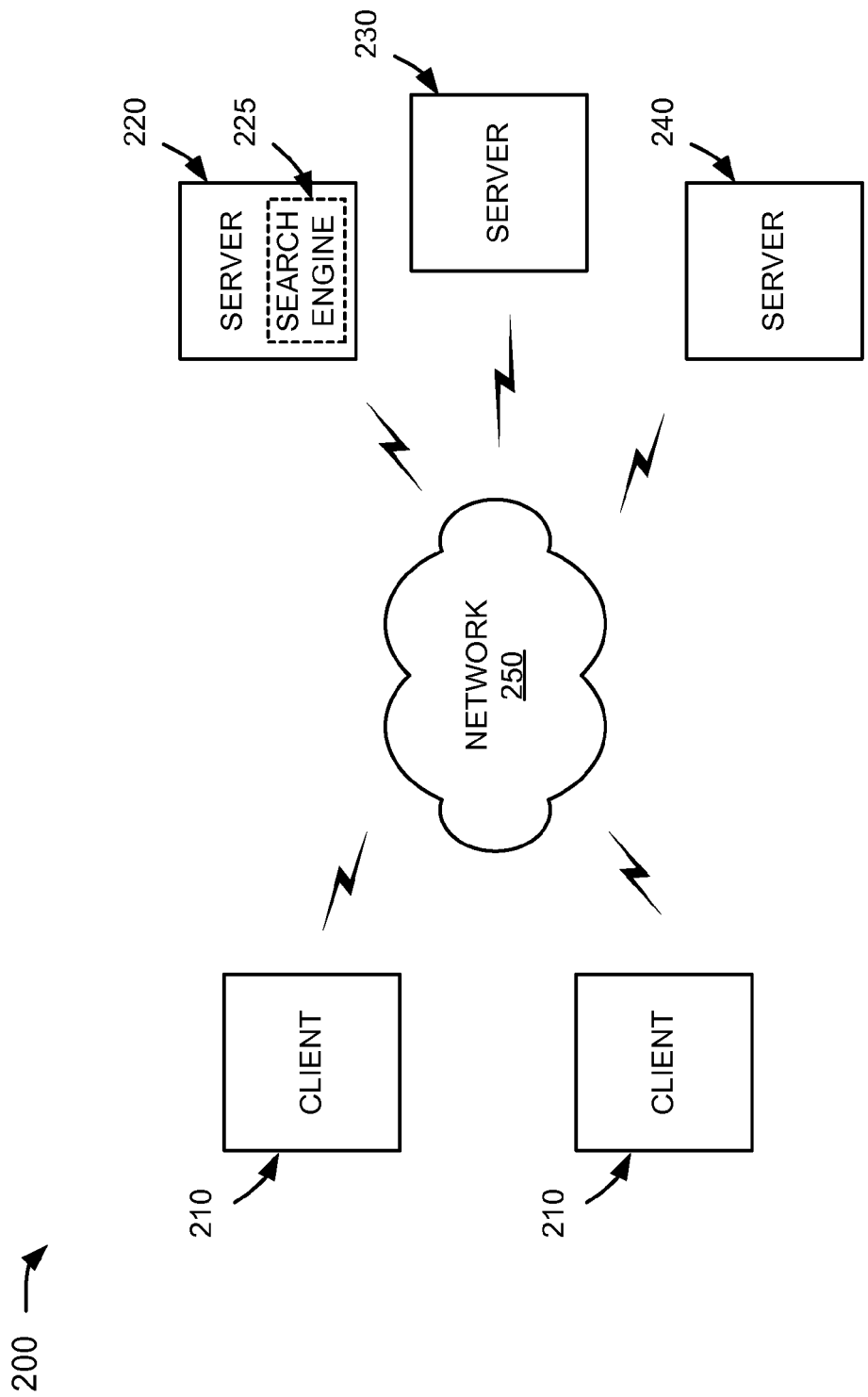
FIG. 2 is an exemplary diagram of a network in which systems and methods consistent with the principles of the invention may be implemented.

FIG. 2 is an exemplary diagram of a network 200 in which systems and methods consistent with the principles of the invention may be implemented. Network 200 may include multiple clients 210 connected to multiple servers 220-240 via a network 250. Two clients 210 and three servers 220-240 have been illustrated as connected to network 250 for simplicity. In practice, there may be more or fewer clients and servers. Also, in some instances, a client may perform the functions of a server and a server may perform the functions of a client.

Clients 210 may include client entities. An entity may be defined as a device, such as a wireless telephone, a personal computer, a personal digital assistant (PDA), a lap top, or another type of computation or communication device, a thread or process running on one of these devices, and/or an object executable by one of these devices. Servers 220-240 may include server entities that gather, process, search, and/or maintain documents in a manner consistent with the principles of the invention.

In an implementation consistent with the principles of the invention, server 220 may include a search engine 225 usable by clients 210. Server 220 may crawl a corpus of documents (e.g., web documents), index the documents, and store information associated with the documents in a repository of documents. Servers 230 and 240 may store or maintain documents that may be crawled or analyzed by server 120.

While servers 220-240 are shown as separate entities, it may be possible for one or more of servers 220-240 to perform one or more of the functions of another one or more of servers 220-240. For example, it may be possible that two or more of servers 220-240 are implemented as a single server. It may also be possible for a single one of servers 220-240 to be implemented as two or more separate (and possibly distributed) devices.

Network 250 may include a local area network (LAN), a wide area network (WAN), a telephone network, such as the Public Switched Telephone Network (PSTN), an intranet, the Internet, a memory device, or a combination of networks. Clients 210 and servers 220-240 may connect to network 250 via wired, wireless, and/or optical connections.

Exemplary Client/Server Architecture

Figure 3:
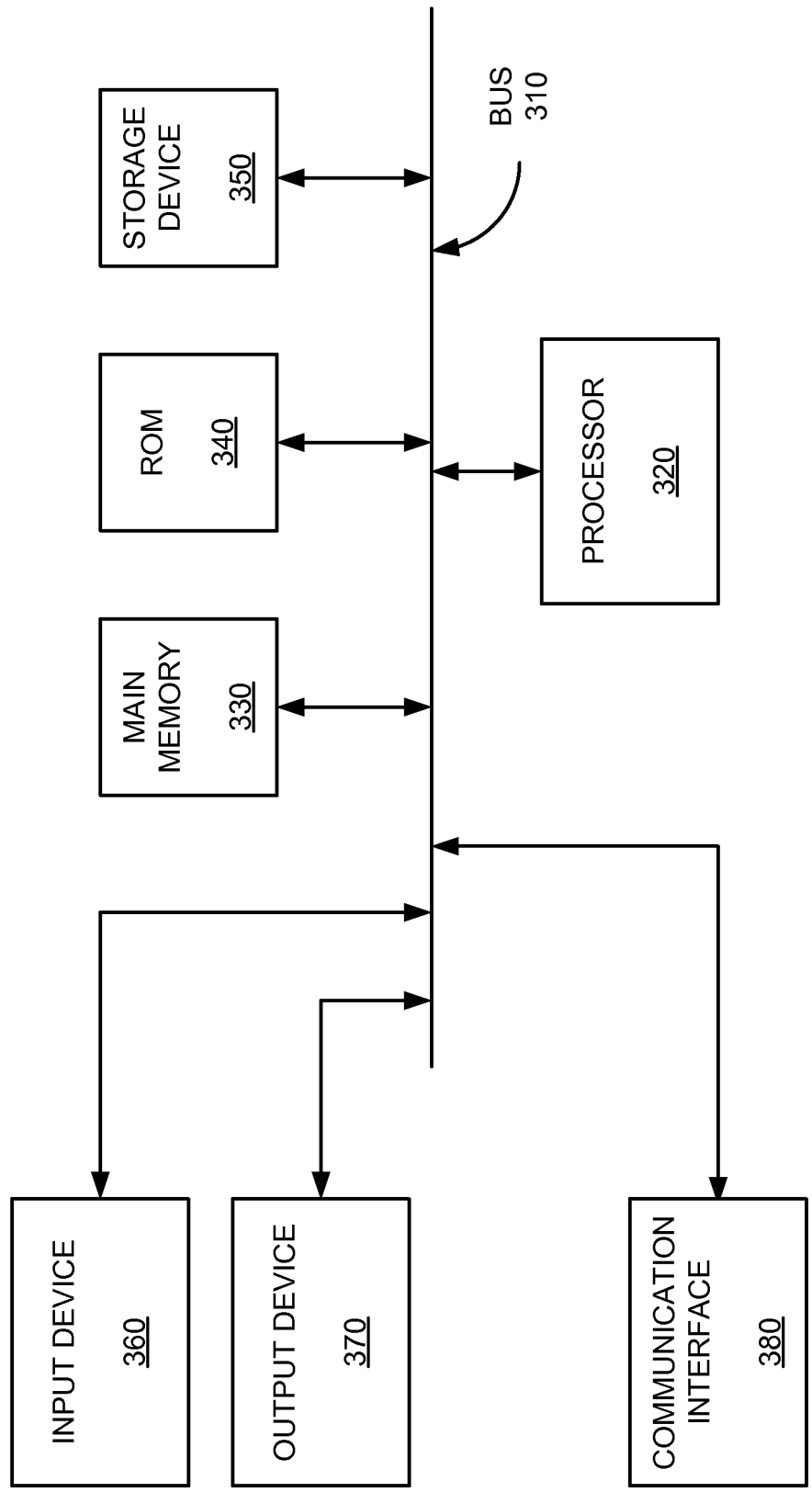
FIG. 3 is an exemplary diagram of a client or server of FIG. 2 according to an implementation consistent with the principles of the invention.

FIG. 3 is an exemplary diagram of a client or server entity (hereinafter called "client/server entity"), which may correspond to one or more of clients 210 and/or servers 220-240, according to an implementation consistent with the principles of the invention. The client/server entity may include a bus 310, a processor 320, a main memory 330, a read only memory (ROM) 340, a storage device 350, an input device 360, an output device 370, and a communication interface 380. Bus 310 may include a path that permits communication among the elements of the client/server entity.

Processor 320 may include a conventional processor, microprocessor, or processing logic that interprets and executes instructions. Main memory 330 may include a random access memory (RAM) or another type of dynamic storage device that may store information and instructions for execution by processor 320. ROM 340 may include a conventional ROM device or another type of static storage device that may store static information and instructions for use by processor 320. Storage device 350 may include a magnetic and/or optical recording medium and its corresponding drive.

Input device 360 may include a conventional mechanism that permits an operator to input information to the client/server entity, such as a keyboard, a mouse, a pen, voice recognition and/or biometric mechanisms, etc. Output device 370 may include a conventional mechanism that outputs information to the operator, including a display, a printer, a speaker, etc. Communication interface 380 may include any transceiver-like mechanism that enables the client/server entity to communicate with other devices and/or systems. For example, communication interface 380 may include mechanisms for communicating with another device or system via a network, such as network 250.

As will be described in detail below, the client/server entity, consistent with the principles of the invention, may perform certain document processing-related operations. The client/server entity may perform these operations in response to processor 320 executing software instructions contained in a computer-readable medium, such as memory 330. A computer-readable medium may be defined as a physical or logical memory device and/or carrier wave.

The software instructions may be read into memory 330 from another computer-readable medium, such as data storage device 350, or from another device via communication interface 380. The software instructions contained in memory 330 may cause processor 320 to perform processes that will be described later. Alternatively, hardwired circuitry may be used in place of or in combination with software instructions to implement processes consistent with the principles of the invention. Thus, implementations consistent with the principles of the invention are not limited to any specific combination of hardware circuitry and software.

Exemplary Processing

Figure 4:
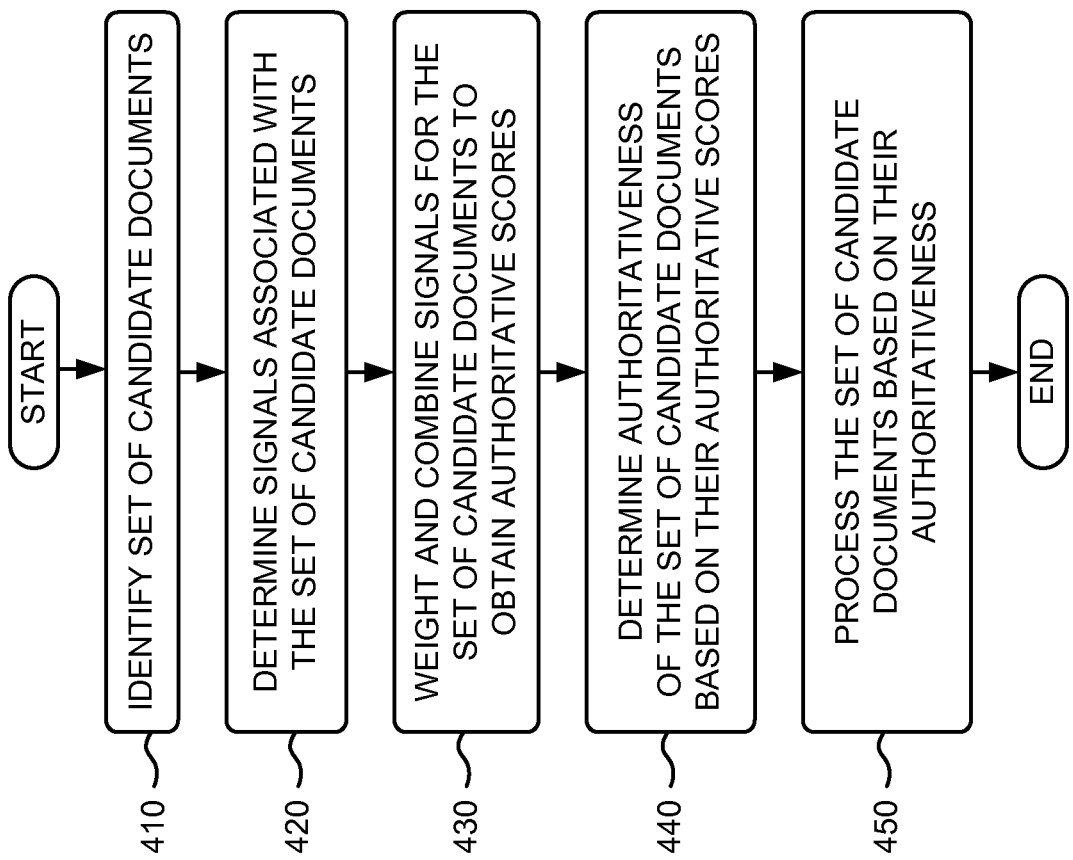
FIG. 4 is a flowchart of exemplary processing for determining the authoritativeness of documents for a location according to an implementation consistent with the principles of the invention.

FIG. 4 is a flowchart of exemplary processing for determining the authoritativeness of documents for a location according to an implementation consistent with the principles of the invention. In one implementation, the processing of FIG. 4 is performed by server 220 (FIG. 2). In another implementation, the processing of FIG. 4 is performed by another a device or a group of devices.

Processing may begin with identification of a set of candidate documents associated with a particular location (block 410). A corpus of documents may be analyzed to identify snippets of text (where a snippet of text may be defined as a portion of a document or the entire document) that include information associated with the location, such as a full or partial address of the location, a full or partial telephone number associated with the location, and/or a full or partial name of a business associated with the location. The documents associated with these snippets may be included as a first group of candidate documents.

Often, a document that includes information associated with a location may link to an authoritative document for that location. Therefore, the documents linked to by the candidate documents in the first group may be included as a second group of candidate documents. A third group of candidate documents may be identified from addresses of candidate documents in the first and second groups, such as by stripping portions of the addresses of the candidate documents in the first and second groups. For example, assume that a candidate document includes the address http://www.abcdef.com/ghijk/lmnop/qrst.htm. Portions of the address may be stripped to identify additional candidate documents. For example, the following additional candidate documents may be included in the third group (if they exist): (1) http://www.abcdef.com/ghijk/lmnop; (2) http://www.abcdef.com/ghijk; and (3) http://www.abcdef.com. The set of candidate documents may be further expanded or expanded in other ways that would be apparent to one skilled in the art.

The first, second, and third groups of candidate documents may be combined to form the set of candidate documents. FIG. 5 is an exemplary diagram that illustrates how documents may be chosen as candidate documents according to an implementation consistent with the principles of the invention. As shown in FIG. 5, group (A) may include documents with snippets of text that include information associated with the location, such as a full or partial address of the location, a full or partial telephone number associated with the location, and/or a full or partial name of a business associated with the location; group (B) may include documents that are linked to by documents in group (A); and group (C) may include documents formed from addresses of documents in groups (A) and (B). The set of candidate documents may be formed from documents in groups (A), (B), and (C).

Returning to FIG. 4, signals associated with the set of candidate documents may be determined (block 420). The signals may correspond to meta data associated with the candidate documents. One type of signal may be associated with the number of outlinks in the candidate documents that point to another candidate document. An authoritative document may be a destination corresponding to outlinks from a large number of candidate documents.

Another type of signal may be associated with anchor text of outlinks that point to the candidate documents. The anchor text may be associated with any document in the document corpus and may be analyzed to determine whether the anchor text matches all or part of the name of the business associated with the location. Text matching may be tricky in this situation because business names can be phrased differently, including partial names and/or misspellings. As a result, a text similarity technique may be used to score words and/or bigrams based on the frequency of occurrence of the words and/or bigrams.

The frequency of occurrence of words and/or bigrams may be determined by analyzing documents on a per geographic area (e.g., zip code) basis. For example, all of the words and bigrams in a set of documents that are known to be associated with a particular geographic area may be counted. Assume that the bigram "New York" is very common to the New York city area and, therefore, has a high count value for the New York city area. Assume further that the bigram "Pandella Shop" is very uncommon to the New York City area and, therefore, has a low count value for the New York city area.

Histograms may be generated for the different geographic areas to identify the words and/or bigrams that are common, or uncommon, to those geographic areas. In the above example, the histogram associated with the New York city area may indicate that the bigram "New York" is common (i.e., occurs frequently in documents associated with the New York city area) and the bigram "Pandella Shop" is uncommon (i.e., occurs very infrequently in documents associated with the New York city area).

Any well known text similarity technique may be used to determine whether anchor text matches all or part of the name of the business associated with the location. More leeway may be given with regard to partial text matches and text matches with misspellings for uncommon words and/or bigrams (e.g., "Pandella Shop") than for common words and/or bigrams (e.g., "New York"). An authoritative document may be a destination corresponding to outlinks whose anchor text matches all or part of the name of the business.

Another type of signal may be associated with document titles of the candidate documents. The text of the candidate documents may be analyzed to determine whether the titles of the documents match all or part of the name of the business associated with the location. A text similarity technique similar to that described above may be used to determine when the title of a candidate document matches all or part of the business name. An authoritative document may include a title that matches all or part of the name of the business.

Another type of signal may be associated with domain names associated with the candidate documents. The text of the domain names may be analyzed to determine whether the text matches all or part of the name of the business associated with the location. Domain names are often pushed together and/or truncated versions of the business name (e.g., Bob's Billiard Shop might appear as BobsBilliard.com or BobsBilliardShop.com). Any well known sub-string matching technique may be used instead of, or in addition to, the text similarity technique described above to determine when the domain name associated with a candidate document matches all or part of the business name. An authoritative document may be associated with a domain name that matches all or part of the name of the business.

The signals for the different candidate documents in the set may be weighted and combined in some manner to obtain an authoritative score (block 430). For example, values (or scores) may be derived for the signals and the values (or scores) may be weighted in some manner. In one implementation, the values (or scores) associated with one or more of the signals, such as the signals associated with the anchor text and/or the domain name, may be weighted more than the values (or scores) associated with another one or more of the signals. The values (or scores) may be combined by, for example, adding them together to obtain an authoritative score for each of the candidate documents in the set.

In one implementation, the authoritative score for a candidate document may be increased if the candidate document is associated with a single location (as opposed to multiple locations). Some candidate documents may include snippets of text that mention different locations but refer (e.g., link) to the same document. For example, one candidate document may mention location A and link to document A, while another candidate document may mention location B and also link to document A. Also, some candidate documents may be associated with multiple locations. For example, a candidate document may mention locations A and B, such as in the case of a business with multiple locations. The authoritative score for a candidate document that is specific to one location may be increased.

The authoritativeness of the candidate documents may be determined based on their authoritative scores (block 440). A document with a higher authoritative score may be determined as more authoritative for the location than a document with a lower authoritative score.

The candidate documents may then be processed based on their authoritativeness (block 450). For example, the authoritative scores of the candidate documents may be used for later processing phases or to control ranking, placement, emphasis, and/or other user interface elements relating to the candidate documents. For example, when a search query relating to a location is later received, a more authoritative document may be presented in a more prominent manner within the search results than a less authoritative document.

EXAMPLE

FIG. 6 is an exemplary diagram of signals that may be considered when identifying the authoritativeness of a document according to an implementation consistent with the principles of the invention. As shown in FIG. 6, document 610 may be determined to be authoritative (i.e., receive a high authoritative score) for the location associated Big Nick's Pizza Joint located at 123 Main Street, Oakmont, Pa. 15302. As explained above, a combination of signals may be used to identify document 610 as authoritative for the location.

Authoritative document 610 is the destination corresponding to outlinks from a number of documents that mention all or part of the location or the business name. Authoritative document 610 is also the destination corresponding to outlinks whose anchor text matches all or part of the business name (e.g., Big Nick's Pizza Joint, Big Nick's Pizza, Big Nick's, Big Nick's Pizza Restaurant, Big Nicks Pizza, and Big Nick Pizza Joint). Authoritative document 610 also includes a title that matches all or part of the business name (e.g., Big Nick's Pizza Joint). Authoritative document 610 includes a domain name that matches all or part of the name of the business (e.g., www.bignicks.com). Authoritative document 610 is also associated with a single location (e.g., 123 Main St., Oakmont, Pa.).

When the various signals are weighted and combined, document 610 may receive a high authoritative score for the location associated with the business Big Nick's Pizza Joint at the address of 123 Main Street, Oakmont, Pa. 15302.

Conclusion

Systems and methods consistent with the principles of the invention may determine the authoritativeness of documents associated with a location. As used herein, "location" is intended to refer to an address and/or a business located at the address.

The foregoing description of preferred embodiments of the present invention provides illustration and description, but is not intended to be exhaustive or to limit the invention to the precise form disclosed. Modifications and variations are possible in light of the above teachings or may be acquired from practice of the invention.

For example, while a series of acts has been described with regard to FIG. 4, the order of the acts may be modified in other implementations consistent with the principles of the invention. Further, non-dependent acts may be performed in parallel.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects were described without reference to the specific software code—it being understood that one of ordinary skill in the art would be able to design software and control hardware to implement the aspects based on the description herein.

No element, act, or instruction used in the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A computer implemented method for identifying an authoritative web page corresponding to a business, the method comprising:
    identifying, using a processor associated with the computer, a plurality of candidate web pages that are associated with the business;
    identifying, using the processor, a plurality of signals respectively associated with each of the plurality of candidate web pages;
    determining, using the processor, an authoritative score for each of the plurality of candidate web pages based on the plurality of signals respectively associated with each of the plurality of candidate web pages,
        the authoritative score for each web page being determined based on one or more of:
            a number of outlinks, in one or more of the plurality of candidate web pages, that point to the web page,
            a match between anchor text associated with the outlinks that point to the web page and a name of the business,
            a match between a title of the web page and the name of the business,
            a number of geographic locations identified in the web page, or
            a match between a domain name associated with the web page and the name of the business,
        determining the authoritative score for each web page of the plurality of candidate web pages including:
            weighting and combining a respective plurality of scores associated with the respective plurality of signals for each web page to determine the authoritative score for each web page; and
    identifying, using the processor, a particular web page of the plurality of candidate web pages as an authoritative web page for the business,
        the particular web page having a highest authoritative score of the authoritative scores for the plurality of candidate web pages.

2. The method of claim 1, where identifying the plurality of candidate web pages includes:
    analyzing web pages in a web page corpus to identify snippets of text that include information associated with the business, and
    identifying web pages that include the snippets of text as candidate web pages.

3. The method of claim 2, where the information associated with the business includes at least one of:
    at least a portion of an address associated with a location of the business,
    at least a portion of a telephone number associated with the business, or
    at least a portion of the name of the business.

4. The method of claim 2, where identifying the plurality of candidate web pages further includes:
    identifying web pages that are linked to the web pages that include the snippets of text as candidate web pages.

5. The method of claim 2, where identifying the plurality of candidate web pages further includes:
    identifying one or more geographic addresses, that are not associated with a location of the business, in the plurality of candidate web pages, and
    identifying additional web pages in the corpus of web pages that are also associated with the one or more geographic addresses.

6. The method of claim 1, where identifying the plurality of candidate web pages includes:
    removing one or more portions of an address of a particular web page included in the plurality of candidate web pages to identify one or more additional web pages as candidate web pages.

7. A system to identify an authoritative web page corresponding to a business, the system comprising:
    one or more computers configured to:
        identify a plurality of candidate web pages that are associated with the business;
        identify a plurality of signals respectively associated with each of the plurality of candidate web pages;
        determine an authoritative score for each of the plurality of candidate web pages based on the plurality of signals respectively associated with each of the plurality of candidate web pages,
            the authoritative score for each web page being determined based on one or more of:
                a number of outlinks in one or more of the plurality of candidate web pages that point to the web page,
                a match between anchor text associated with the outlinks that point to the web page and a name of the business,
                a match between a title of the web page and the name of the business,
                a number of geographic locations identified in the web page, or a match between a domain name associated with the web page and the name of the business, when determining the authoritative score for each candidate web page of the plurality of candidate web pages, the one or more computers being to:

weight and combine a respective plurality of scores associated with the respective plurality of signals for each candidate web page to determine the authoritative score for each candidate web page; and identify a particular web page of the plurality of candidate web pages as an authoritative web page for the business, the particular web page having a highest authoritative score of the authoritative scores for the plurality of candidate web pages.

8. The system of claim 7, where the one or more computers, when identifying the plurality of candidate web pages, are further to:

analyze web pages in a web page corpus to identify snippets of text that include information associated with the business; and identify web pages that include the snippets of text as candidate web pages.

9. The system of claim 8, where the information associated with the business includes at least one of:

at least a portion of an address associated with a particular location of the business, at least a portion of a telephone number associated with the business, or at least a portion of the name of the business.

10. The system of claim 8, where the one or more computers, when identifying the plurality of candidate web pages, are further to:

identify web pages that are linked to the web pages that include the snippets of text as candidate web pages.

11. The system of claim 10, where the one or more computers, when identifying the plurality of candidate web pages, are further to:

identify one or more geographic addresses that are not associated with a location of the business, in the plurality of candidate web pages, and identify additional web pages in the corpus of web pages that are also associated with the one or more geographic addresses as candidate web pages.

12. The system of claim 7, where the one or more computers, when determining the authoritative score, are further to:

increase the authoritative score, for one of the plurality of candidate web pages when the number of geographic locations associated with the one of the plurality of candidate web pages is less than a threshold.

13. The system of claim 7, where, when identifying the plurality of candidate web pages, the one or more computers are configured to:

remove one or more portions of an address of a particular web page included in the plurality of candidate web pages to identify one or more additional web pages as candidate web pages.

14. A non-transitory computer-readable medium to store instructions, the instructions comprising:

one or more instructions which, when executed by a processor, cause the processor to identify a plurality of candidate web pages that are associated with a business;

one or more instructions which, when executed by the processor, cause the processor to identify a plurality of signals respectively associated with each of the plurality of candidate web pages;

one or more instructions which, when executed by the processor, cause the processor to determine an authoritative score for each of the plurality of candidate web pages based on the respective plurality of signals, the authoritative score for each web page being determined based on one or more of:

a number of outlinks in one or more of the plurality of candidate web pages that point to the web page, a match between anchor text associated with the outlinks that point to the web page and a name of the business, a match between a title of the web page and the name of the business, a number of geographic locations identified in the web page, or a match between a domain name associated with the web page and the name of the business, and the one or more instructions to determine the authoritative score for each web page of the plurality of candidate web pages, when executed by the processor, further cause the processor to:

weight and combine a respective plurality of scores associated with the respective plurality of signals for each candidate web page to determine the authoritative score for each candidate web page; and one or more instructions which, when executed by the processor, cause the processor to identify a particular web page of the plurality of candidate web pages as an authoritative web page for the business, the particular web page having a highest authoritative score of the authoritative scores for the plurality of candidate web pages.

15. The non-transitory computer-readable medium of claim 14, where the one or more instructions to identify the plurality of candidate web pages further include:

one or more instructions to analyze web pages in a web page corpus to identify snippets of text that include information associated with the business; and one or more instructions to identify web pages that include the snippets of text as candidate web pages.

16. The non-transitory computer-readable medium of claim 15, where the information associated with the business includes at least one of:

at least a portion of an address associated with a location of the business, at least a portion of a telephone number associated with the business, or at least a portion of the name of the business.

17. The non-transitory computer-readable medium of claim 15, where the one or more instructions to identify the plurality of candidate web pages further include:

one or more instructions to identify web pages that are linked to the web pages that include the snippets of text as candidate web pages.

18. The non-transitory computer-readable medium of claim 17, where the one or more instructions to identify the plurality of candidate web pages further include:

one or more instructions to identify one or more geographic addresses, that are not associated with a location of the business, in the plurality of candidate web pages, and one or more instructions to identify additional web pages in the web page corpus that are also associated with the one or more geographic addresses as candidate web pages.

19. The non-transitory computer-readable medium of claim 14, where the one or more instructions to determine the authoritative score for each web page of the plurality of candidate web pages further include:
 one or more instructions to increase the authoritative score for each web page of the plurality of candidate web pages when the number of geographic locations associated with the one of the plurality of candidate web pages is less than a threshold.

20. The non-transitory computer-readable medium of claim 14, where the one or more instructions to identify the plurality of candidate web pages include:
 one or more instructions to remove one or more portions of an address of a particular web page included in the plurality of candidate web pages to identify one or more additional web pages as candidate web pages.

* * * * *